(12) United States Patent
Kuo

(10) Patent No.: US 9,213,478 B2
(45) Date of Patent: Dec. 15, 2015

(54) VISUALIZATION INTERACTION DESIGN FOR CROSS-PLATFORM UTILIZATION

(71) Applicant: Heng-Chun Scott Kuo, Surrey (CA)

(72) Inventor: Heng-Chun Scott Kuo, Surrey (CA)

(73) Assignee: Business Objects Software, Dublin (IE)

(*) Notice: Subject to any disclaimer, the term of this patent is extended or adjusted under 35 U.S.C. 154(b) by 340 days.

(21) Appl. No.: 13/724,631

(22) Filed: Dec. 21, 2012

(65) Prior Publication Data

US 2014/0181756 A1    Jun. 26, 2014

(51) Int. Cl.
*G06F 3/048* (2013.01)
*G06F 3/0488* (2013.01)
*G06F 3/0484* (2013.01)

(52) U.S. Cl.
CPC ........... *G06F 3/0488* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 5,414,809 | A | * | 5/1995 | Hogan et al. .................. 715/765 |
| 5,894,311 | A | * | 4/1999 | Jackson ........................ 345/440 |
| 2006/0031187 | A1 | * | 2/2006 | Pyrce et al. ....................... 707/1 |
| 2012/0233573 | A1 | * | 9/2012 | Sullivan et al. ............... 715/848 |

* cited by examiner

*Primary Examiner* — Matt Kim
*Assistant Examiner* — Tuan S Nguyen
(74) *Attorney, Agent, or Firm* — Schwegman Lundberg & Woessner, P.A.

(57) ABSTRACT

A method and system for visualization interaction design for cross-platform utilization is described. The system includes a unified user interface interaction module and a visualization module. The visualization module generates an interactive graph for data visualization. The unified user interface interaction module includes a unified user interface module configured to receive an operation on the interactive graph. The unified user interface module includes a pointer user interface module and a touchscreen user interlace module. The visualization module updates the interactive chart from the operation on the interactive graph with the corresponding user interlace module.

16 Claims, 17 Drawing Sheets

VISUALIZATION INTERACTION DESIGN FOR CROSS-PLATFORM UTILIZATION

FIELD

The present disclosure relates generally to a user interface visualization component, and in a specific example embodiment, to cross-perform visualization interaction design.

BACKGROUND

Visualization of data in the form of a graph is commonly performed by using a computer application such as a spread sheet application to generate a graph. For example, the visualisation of data can take the form of a bar chart, a graph, or a pie chart. The charts are typically generated on a two-dimensional or three-dimensional axis graph where the charts represent data from data structures from a spread sheet or database. Manipulation of the charts is typically performed by specifying the relevant data in the spread sheet application. A user would manually determine areas in the graph to highlight to emphasize attention. The user would then draw on the graph or mark up these areas of interest in the graph accordingly. To further exacerbate this manual process, the user may interact with the graph from different types of user interface platforms.

BRIEF DESCRIPTION OF DRAWINGS

The appended drawings merely illustrate example embodiments of the present invention and cannot be considered as limiting its scope.

Figure 1:
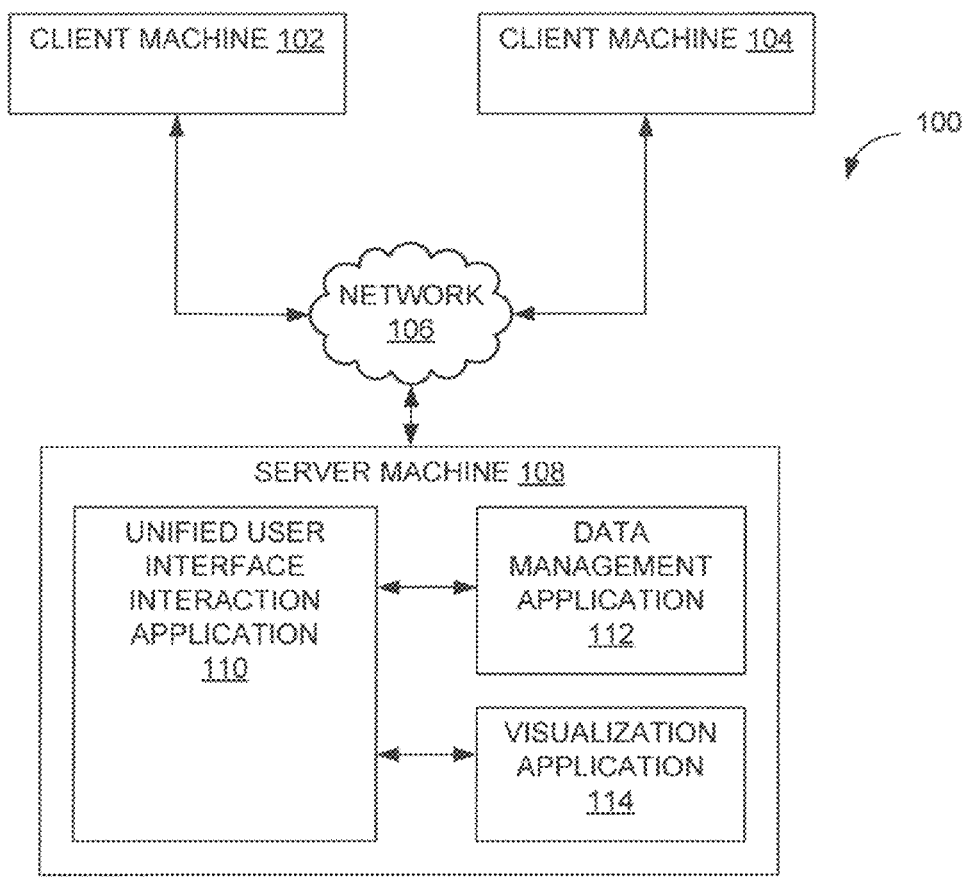
FIG. 1 is a block diagram illustrating an example of a system in which embodiments may be practiced.

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art, that embodiments of the inventive subject matter may be practiced without these specific details, in general, well-known instruction instances, protocols, structures, and techniques have not been shown to detail.

Example systems and methods for visualization interaction design for cross-platform utilization is described. The system includes a unified user interface interaction module and a visualization module. The visualization module generates an interactive graph for data visualization. The interactive graph may include, for example, a bar chart, a stacked bar chart, a pie chart, or a line chart among others. The unified user interface interaction module includes a unified user interface module configured to receive an operation on the interactive graph. The unified user interface module may include a pointer user interface module and a touchscreen user interface module. The pointer user interface may be configured to track a pointer controlled by a cursor control device. The touchscreen user interface may be configured to detect a tap or a touch on a touchscreen display. The visualization module updates the interactive chart from the operation on the interactive graph with the corresponding user interface module.

In one embodiment, the unified user interface interaction module comprises a data selection module configured to determine a selection of data in the interactive graph using the unified user interface. A select data analysis module may compute a data analysis based on the selection of data in the interactive graph and may generate information from the data analysis for display in the interactive graph.

In one embodiment, the unified user interface interaction module comprises a data selection module configured to receive a selection of a first component of the interactive graph using the unified user interface. The visualization module may dim a display of the non-selected components of the interactive graph and may outline the selected first component.

In one embodiment, the unified user interface interaction module comprises a data selection module configured to receive a selection of a second component of the interactive graph using the unified user interlace. The visualization module may outline the selected first and second components without a modifier key from the unified user interface.

In one embodiment, the unified user interface interaction module comprises a data selection module configured to detect a swipe gesture corresponding to a plurality of components of the interactive graph using the touchscreen user interface. The data visualisation module may highlight the selection of the plurality of components of the interactive graph. The selected data analysis module may compute a data analysis based on the selection of the plurality of components in the interactive graph. The data visualization module may generate information from the data analysis for display in the interactive graph.

In one embodiment, the unified user interface interaction module comprises a data selection module configured to receive a selection of a higher ordered member value label in the interactive graph using the unified user interface. The data visualization module may highlight a plurality of components in the interactive graph corresponding to the selected higher ordered member value label. The select data analysis module computes a data analysis based on the plurality of components in the interactive graph. The visualization module may generate information from the data analysis for display in the interactive graph.

In one embodiment the unified user interface interaction module comprises a data selection module configured to determine a selection of a label corresponding to an axis of the interactive graph using the unified user interface. The axis may be associated with a plurality of labels. The visualization module may collapse a display of the plurality of labels in response to the selection of the label to generate a combined label corresponding to the axis of the interactive graph.

FIG. 1 is a block diagram depicting an example environment 100 within which example embodiments may be deployed. The environment 100 includes one or more client machines (e.g., client machines 102, 104). For example, the client machines 102, 104 may be a personal computer, or a mobile computing device of participants of a business task.

In one embodiment, the client machine 102 may be used to access elements or processes from a server machine 108. For example, a user interface in the form of a web browser or an application may be provided for the user to access and visualize data from the server machine 108. The client machine 102 may execute a web browser (not shown) or a software application (not shown) to access a graph or a chart from the server machine 108. For example, the web browser may be any browser commonly used to access a network of computers such as the World Wide Web. The web browser may load a user interface to retrieve a graphical visualization of data hosted at the server machine 101 or at another location such as a remote or networked storage server. In another embodiment, the client machine 102 stores the data to be visualized and loads an application on the client machine 102 to render a graph or chart based on the data at the client machine 102.

The environment 100 may also include the server machine 108. The server machine 108 executes one or more applications: a unified user interface interaction application 110, a data management application 112, and a visualization application 114.

The data management application 112 includes, for example, a database application configured to retrieve data from a data structure stored in a storage device (not shown) of the server machine 108 or from a networked storage device. The data may include, for example, sales figures, historical data, or revenue statistics for a business application. The data management application 112 may be hosted in the server machine 108 or in the client machine 102.

In one embodiment, the visualisation application 114 may be configured to generate a visualization display for the data from data management application 112. For example, the visualisation display may include a graph or chart rendered based on sales figures accessed by the data management application 112. Those of ordinary skill in the art will recognize that visualization display of data from a data structure such as a database or spread sheet can be visualized in many ways: two-dimensional bar graphs, two-dimensional plot chart, two-dimensional pie chart, three-dimensional bar graphs, stacked bar graphs, and so forth. The visualization application 114 may be hosted in the server machine 108 and/or in the client machine 102.

The unified user interface interaction application 110 enables a user at the client machine 102 or 104 to uniformly interact with a display of a graph or chart generated by the visual lotion application 114. For example, the user may wish to manipulate the graph using a cursor or pointer controlled by a mouse on the client machine 102 at his or her office. In another example, while on the road, the user may wish to manipulate the graph displayed on a touchscreen surface of a tablet computer. As such, the unified user interface interaction application 110 provides a uniform way to manipulate the graph consistently across different user interface platforms (e.g., using a mouse or a touchscreen). Without the presently described unified user interface interaction application 110, the visualisation application 114 may behave differently in response to a click on a mouse or a tap on a touchscreen. In one embodiment, the user interface may reside or be hosted at the client machine 102 without having to access the server machine 108.

As such, the unified user interface interaction application 110 may define a unified interaction model which works on both desktop and mobile devices (incl. tablets, slates, phones). Furthermore, the visualisation application 114 may be configured to further simplify visual design of data visualization. The unified user interface interaction application 110 may further define equivalent UI behaviors between clicks (mouse) and laps (touch), improve input error tolerance by means of enlarge UI "response areas", enhance summary data display to include metadata, enhance summary data layout to facilitate a user's analysis goals, and simplify color palette while maintaining sufficient contrast for accessibility.

The client machines 102, 104, and the server machine 108 may be coupled to each other via a network 106. The network 106 enables communication between systems. Accordingly, the network 106 may be a mobile telephone network, a Plain Old Telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet proctocols, and instant messaging protocols. The network 106 may be implemented using the Internet, a wide area network (WAN), a local area network (LAN), or any suitable combination thereof.

In one embodiment, the user interface at the client machine 102 may be generated at the server machine 108 and, as such, can be accessible from any client machine 102. In another embodiment, the user interface may be generated at the client machine 102 without having to access the server machine 108. For example, the unified user interface interaction application 110, the data management application 112, and the visualization application 114 may reside in the client machines 102 and 104.

Figure 2:
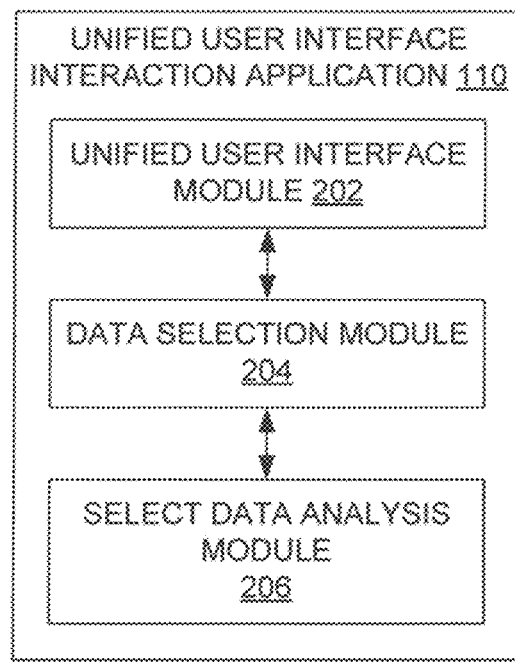
FIG. 2 is a block diagram illustrating a unified user interface interaction application, in accordance with an example embodiment.

FIG. 2 is a block diagram illustrating as example embodiment of the unified user interface interaction application 110. The unified user interface interaction application 110 may include, for example, a unified user-interface module 202, a data selection module 204, and a select data analysis module 206.

Figure 3:
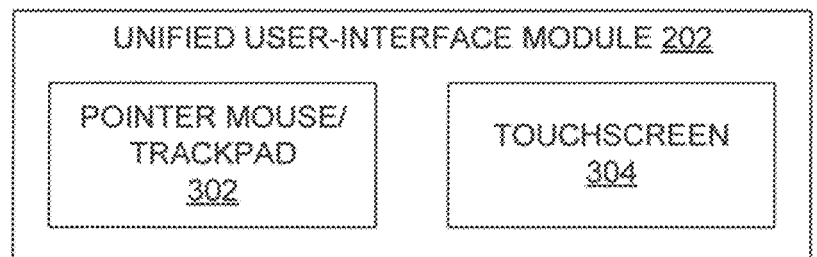
FIG. 3 is a block diagram illustrating an example embodiment of a unified user interface module.

The unified user interface module 202 may include different types of user interface platforms. For example, FIG. 3 illustrates the unified user interface module 202 having a pointer mouse/trackpad platform 302 and a touchscreen platform 304. The unified user interface module 202 may include a definition that translates corresponding operations from the different user interface platforms. For example, a tap in a predefined area on the interactive graph on a touchscreen may correspond to a click from a mouse in the predefined area of the interactive graph. A swipe gesture on the interactive graph on the touchscreen may correspond to a click and hold action from a mouse of a computer. Those of ordinary skill in the art will recognize that other gestures or taps on a touchscreen may be translated into corresponding actions or operations from a mouse of a computer.

In one embodiment, the tapping sensitivity area in the interactive graph may be adjusted accordingly because the accuracy of a pointer manipulated by a mouse is higher than the accuracy of tapping on a touchscreen. In other words, a user can accurately select an area on the interactive graph using a mouse. On the other hand, a user may not be as accurate using his or her fingertip when tapping on the interactive graph.

Referring back to FIG. 2, the unified user interface module 202 may provide a unified user interface to receive an operation on the interactive graph. The operation may include a selection of a data item such as a bar or a line, or a selection of several data items such as several bars or lines. The operation may also include a selection of an area on the interactive graph that corresponds to another element of the interactive graph such as a bar or a line.

The data selection module 204 may determine the operation on the interactive graph from the corresponding user interface (e.g. touchscreen user interface, pointer user interface). For example, if the user interacted with the interactive graph on a tablet or mobile device with a touchscreen user interface, the corresponding touchscreen platform 304 may be used to determine what operations where performed on the screen (swipe gesture, tap, and so forth). The data selection module 204 determines a selection of data in the interactive graph using the unified user interface. As previously described, the selection of data include a selection of individual data items such as a bar or a line from the interactive graph, or a selection of several data items such as several bars from the interactive graph. The operation may also include a selection of an area on the interactive graph that corresponds to another element of the interactive graph such as a bar or a line. For example, the user may select an area aligned, with, or adjacent to an individual bar. In another example, the user may select other areas of the interactive graph such as a label, an axis, or legends in the interactive graph.

The select data analysis module 206 may compute a data analysis based on the selection of data in the interactive graph and generate information from the data analysis for display in the interactive graph. For example, if the user selects an individual bar of the interactive graph, a summary box may be generated and displayed in the interactive graph to summarize the data corresponding to the selected individual bar. The data may include, for example, a name of the selected individual bar and a value corresponding to the selected individual bar among others.

In another example, if the user selects several individual bars of the interactive graph, the summary box may be generated and displayed in the interactive graph to summarize the data corresponding to the selected several individual bars.

In one embodiment, after the data selection module 204 receives a selection of a first component of the interactive graph using the unified user interface, the visualization application 114 may dim a display of the non-selected components of the interactive graph and outline the selected first component (e.g., a select bar) of the interactive graph. In another embodiment, the data selection module 204 receives a selection of a second component of the interactive graph using the unified user interface. The visualization application 114 may outline the selected first and second components without using a modifier key from the unified user interface. Conventionally, in order to select multiple items or components in the interactive graph, a user who would have to hold the modifier key such as the control key on the keyboard while selecting other hems or components. In contrast, the present disclosure describes a method for selecting multiple components of the interactive graph without using the modifier key. Conversely, selected items and components in the interactive graph may also be deselected without having to use the modifier key.

The data selection module 204 may also receive a selection of a higher ordered member value label in the interactive graph using the unified user interface. For example, the graph may include several states labels (e.g, "California", and so forth . . . ) under a higher ordered member value label (e.g. "state"). The visualisation application 114 then highlights the components (e.g. the different states) in the interactive graph corresponding to the selected higher ordered member value label (e.g., "state"). The select data analysis module 206 may then compute a data analysis based on all the states under the higher state label in the interactive graph. In order words, the select data analysis module 206 may compute an average, or a summary of the data from the selected states. The visualization module may generate information from the data analysis for display in the interactive graph. For example, a dialog box summarizing the data from the states may be displayed in the interactive graph.

Figure 4A:
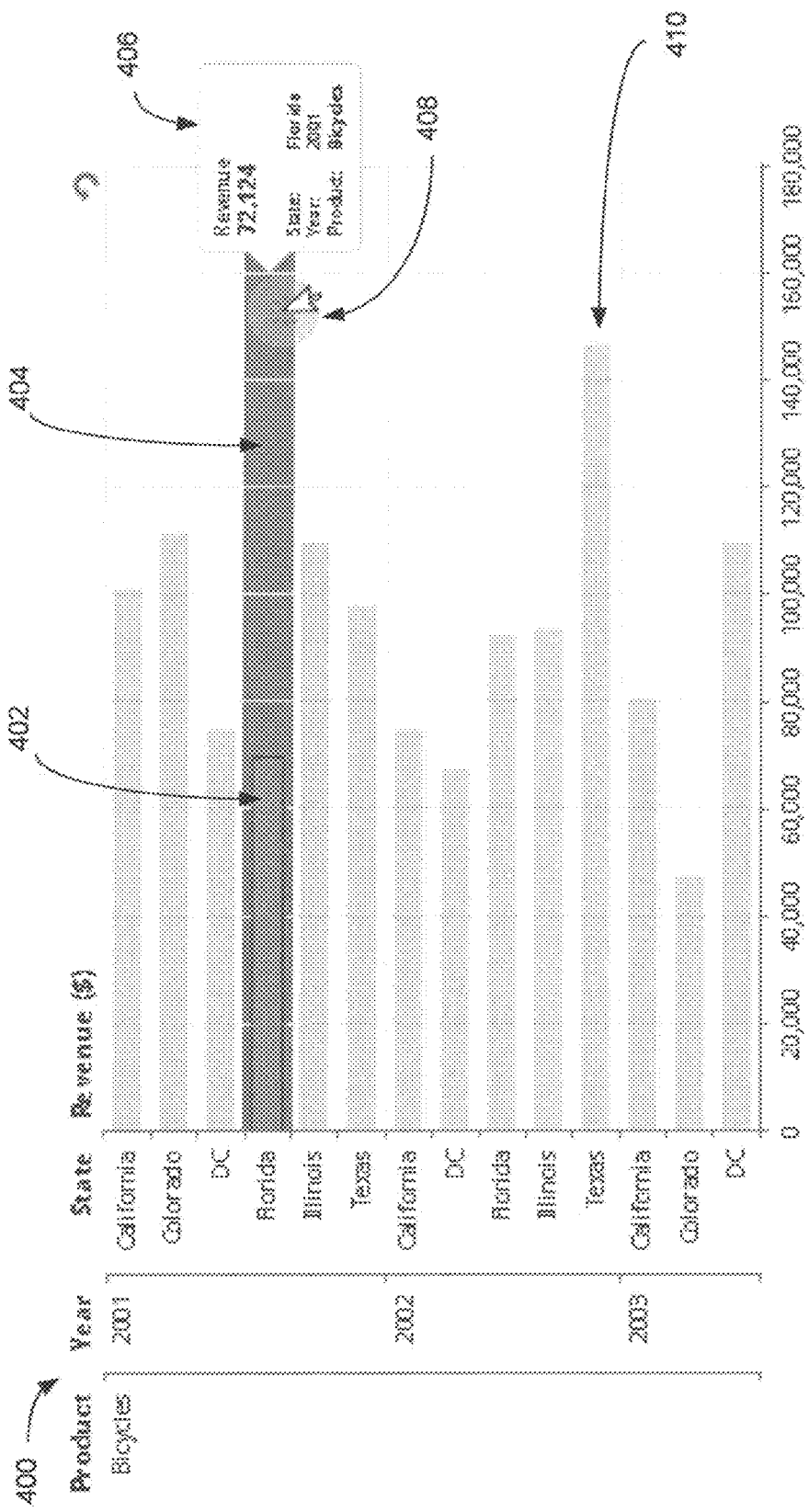
FIG. 4A is a diagram illustrating an example graph using the unified user interface interaction application to select an individual bar.

FIG. 4A is a diagram illustrating an example graph 400 using the unified user interface interaction application 110 to select an individual bar 402. The example graph 400 illustrates a bar graph to visualize revenues by state, year, and product. The unified user interface module 202 detects an operation on the example graph 400. The operation, for example, may include a tap or a click corresponding to location 408 on a display of the example graph 400. The data selection module 204 determines the individual bar 402 corresponding to the location 408. In one embodiment, the individual bar 402 is highlighted in a different color or shade than the remaining non-selected bars 410. The visualization application 114 generates an indicator bar 402 to indicate that the selected location 408 corresponds to the individual bar 402. Furthermore, the indicator bar 402 may be used to provide a visual guide and feedback for the user. The select data analysis module 206 generates and displays a summary dialog box 406 adjacent to the location 404 in the example graph 400. The summary dialog box 406 includes for example, the revenue value corresponding to the selected bar 402 (e.g., "Florida"), the corresponding state, the corresponding year, and the corresponding product. In other words, the summary dialog box 406 provides a quick visual summary for the user having identified the individual bar 402.

It should be noted that the user was able to select an individual bar without actually tapping on the individual bar. Instead, the user tapped in an area 404 adjacent and corresponding to the individual bar 402.

Figure 4B:
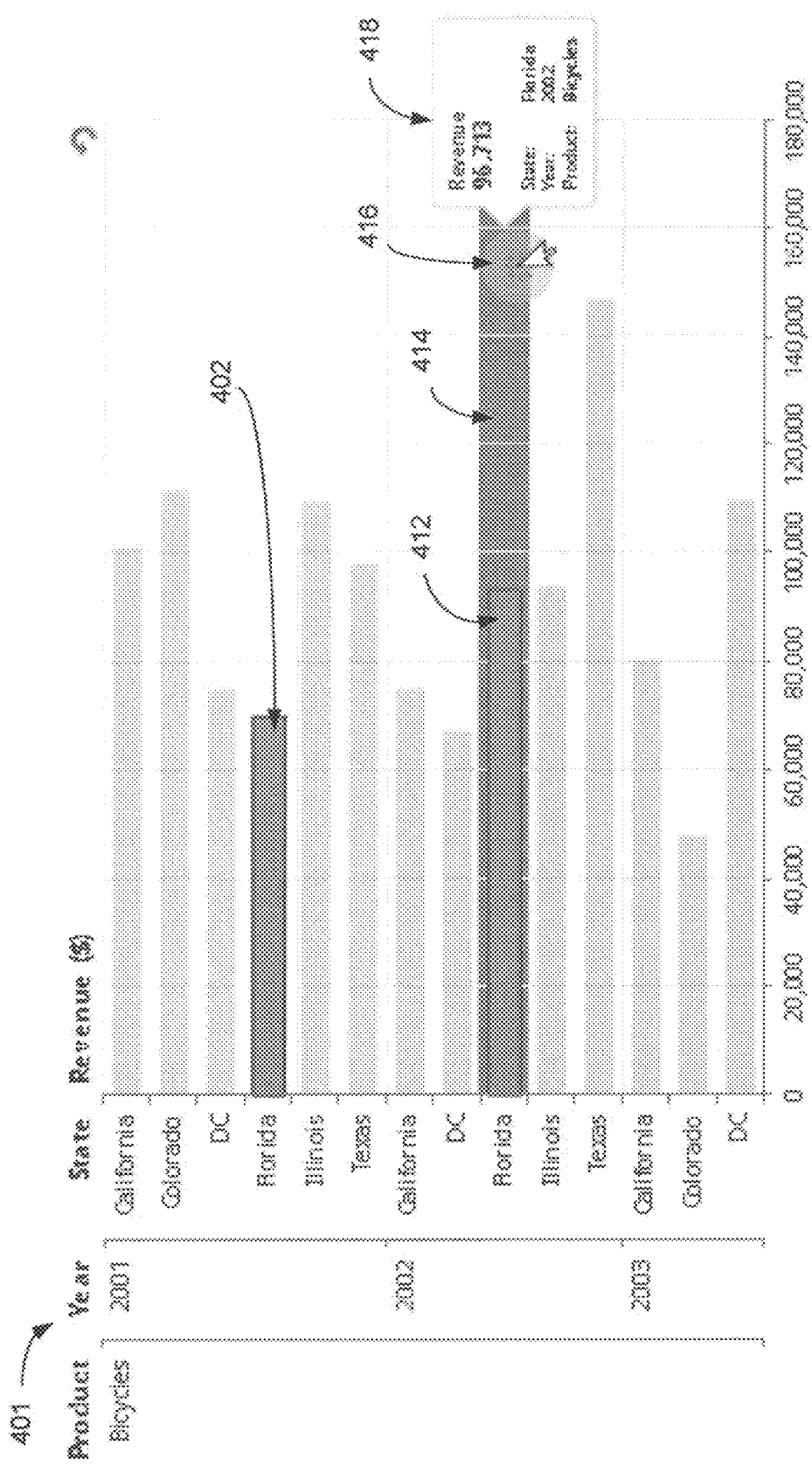
FIG. 4B is a diagram illustrating an example graph using the unified user interface interaction application to select another individual bar.

FIG. 4B is a diagram illustrating an example graph 401 using the unified user interface interaction application 110 to select another individual bar 412. The unified user interface module 202 detects an operation on the example graph 401. In this example, the operation may be a tap or a click corresponding to location 416 on a display of the example graph 401 after the user has tapped location 408 in FIG. 4A. The data selection module 204 determines the individual bar 412 corresponding to the location 416. In one embodiment, the individual bar 412 is highlighted in a different color or shade than the remaining non-selected bars 410. The visualization application 114 generates an indicator bar 414 to indicate that the selected location 416 corresponds to the individual bar 412. Furthermore, the indicator bar 412 may be used to provide a visual guide and feedback for the user. The select data analysis module 206 generates and displays a summary dialog box 418 adjacent to the location 416 in the example graph 401. The summary dialog box 418 includes, for example, the revenue value corresponding to the selected bar 412 (e.g., "Florida"), the corresponding state, the corresponding year (e.g., "2001"), and the corresponding product. In other words, the summary dialog box 418 provides a quick visual summary for the user having identified the individual bar 412.

In one embodiment, the user does not have to use a modifier key to select multiple items or components in the interactive graph. Normally, a user who would hold the modifier key such as the control key on the keyboard while selecting other items or components. In contrast, the present disclosure describes a method for selecting multiple components of the interactive graph without using the modifier key. This feature may also be referred to as "sticky click." Conversely, selected items and components in the interactive graph may also be deselected without having to use the modifier key.

Figure 4C:
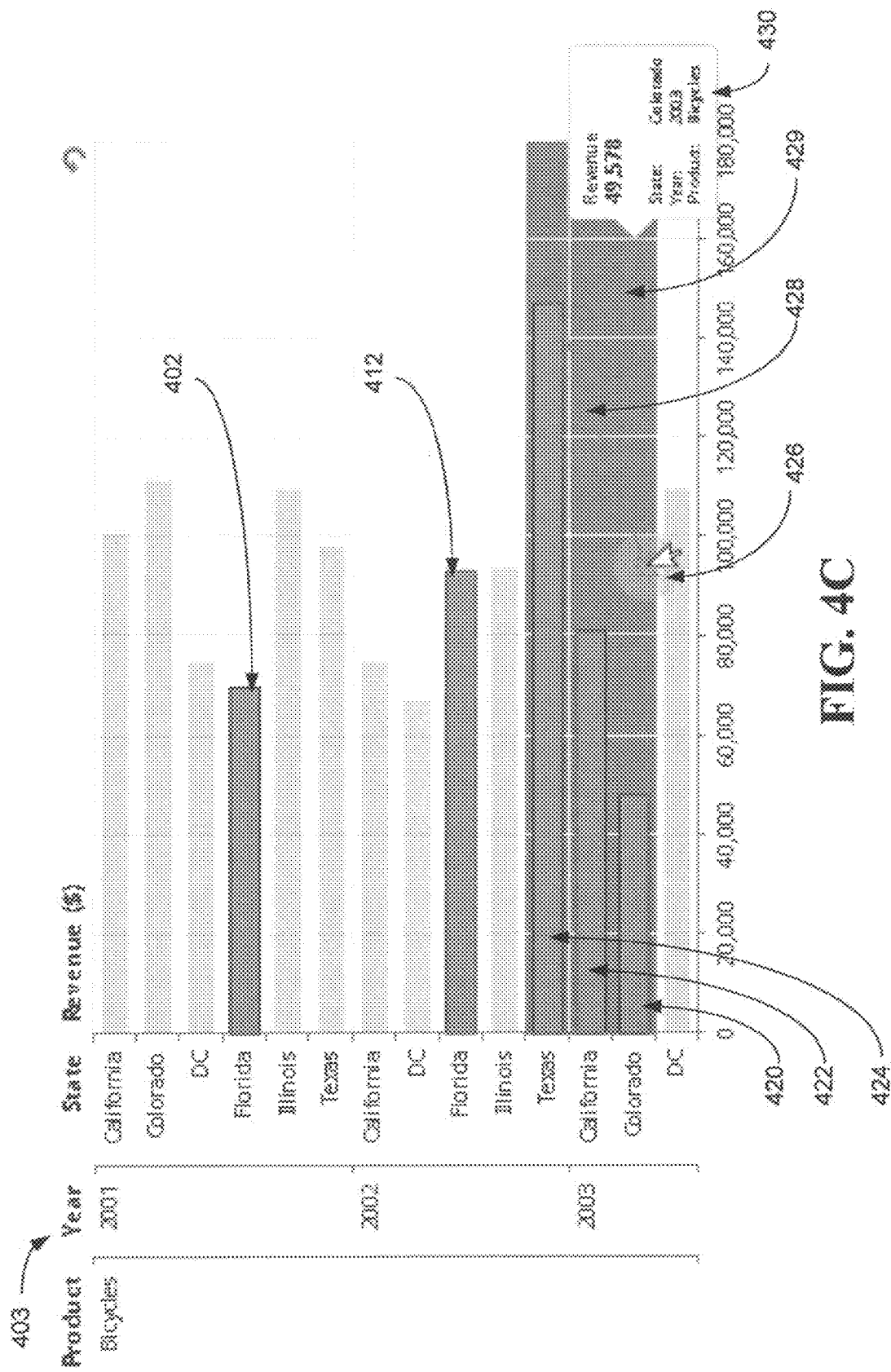
FIG. 4C is a diagram illustrating an example graph using the unified user interface interaction application to select multiple bars.

FIG. 4C is a diagram illustrating an example graph 403 using the unified user interface interaction application 110 to select multiple bars. In this example, the operation may be a swipe 428 ending in location 426 after the user has clicked on location 416 in FIG. 4B. The data selection module 204 determines that the swipe 428 corresponding to multiple bars 420, 422, and 424. Similarly, the multiple bars 420, 422, and 424 are highlighted in a different color or shade than the remaining non-selected bars 410. The visualization application 114 generates an indicator bar 429 corresponding to the selected bars 412. Furthermore, the indicator bar 429 may be used to provide a visual guide and feedback for the user. The select data analysis module 206 generates and displays a summary dialog box 430 adjacent to the indicator bar 429 in the example graph 403. The summary dialog box 430 includes, for example, the revenue value corresponding to the selected bar 420 (e.g., "Colorado"), the corresponding state, the corresponding year (e.g., "2003"), and the corresponding product. In other words, the summary dialog box 430 provides a quick visual summary for the user having identified the individual bar 420 as the last bar in selection action.

Figure 4D:
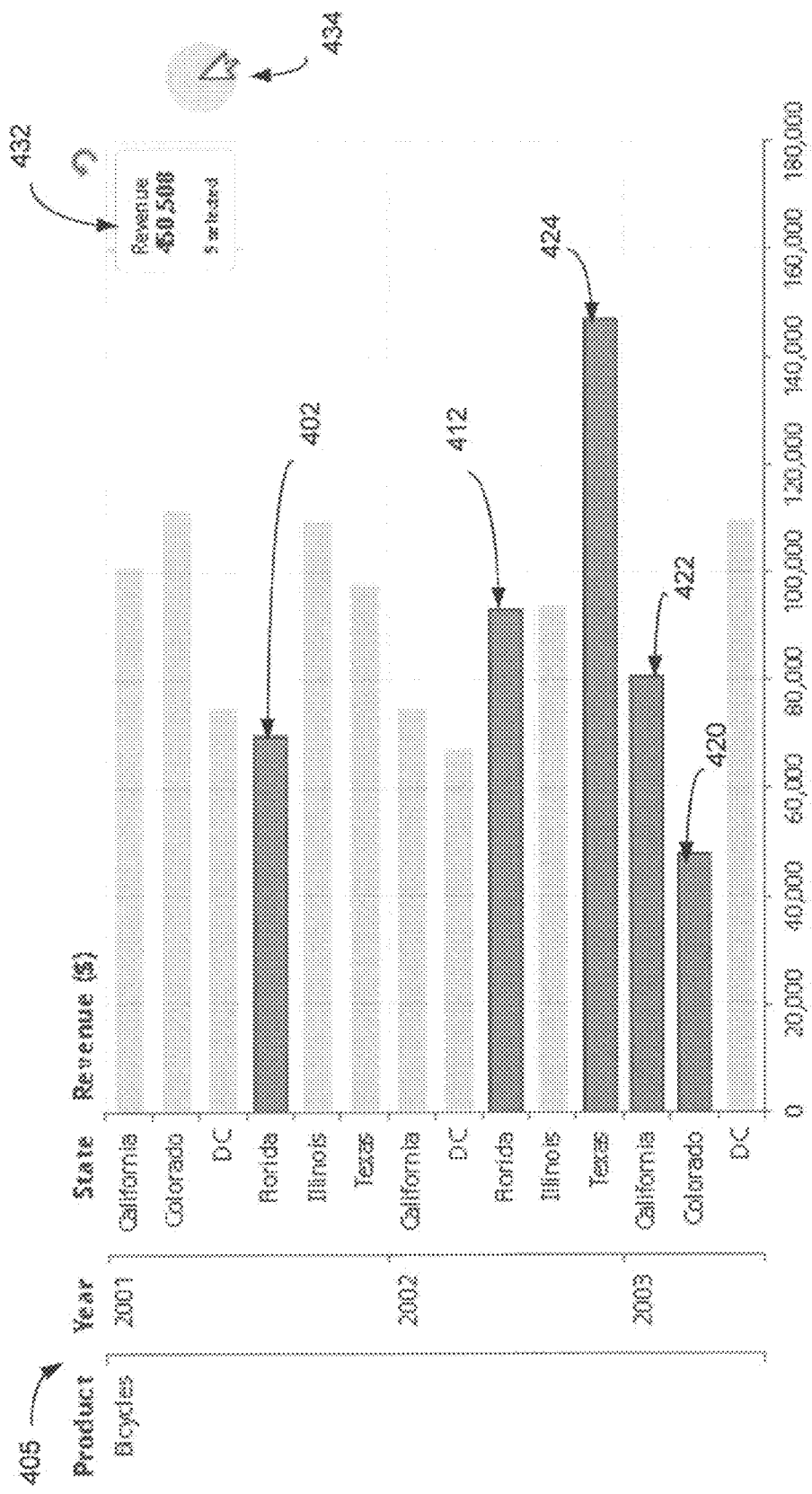
FIG. 4D is a diagram illustrating an example graph using the unified user interface interaction application to generate a summary data of select multiple bars.

FIG. 4D is a diagram illustrating an example graph 405 using the unified user interface interaction application 110 to generate a summary data of the selected multiple bars. The example graph 405 illustrates a bar graph to visualize revenues by state, year, and product. The unified user interface module 202 detects an operation on the example graph 400. The operation, for example, may include a tap or a click corresponding to location 434 on a display of the example graph 405. The data selection module 204 determines that the location 434 is outside the example graph 405. In one embodiment, the multiple bars 402, 412, 420, 422, 424 selected from previous operations in FIGS. 4A-4C are highlighted in a different color or shade than the remaining non-selected bars 410. The select data analysis module 206 generates and displays a summary dialog box 432 in the example graph 400. The display location of the summary dialog box 432 may depend on the type of graph. For example, for a bar chart, the summary dialog box may be located in a top right corner whereas for a pie chart, the summary dialog box may be placed in the center of the pie. The summary dialog box 432 is based on the values corresponding to multiple bars 402, 412, 420, 422, and 424. For example, the revenue value corresponding to the multiple bars 402, 412, 420, 422, and 424 may be the combined total revenue from the states corresponding to the multiple bars 402, 412, 420, 422, and 424. In other words, the summary dialog box 432 provides a quick visual summary for the user having identified the multiple bars 402, 412, 420, 422, 424.

Figure 4E:
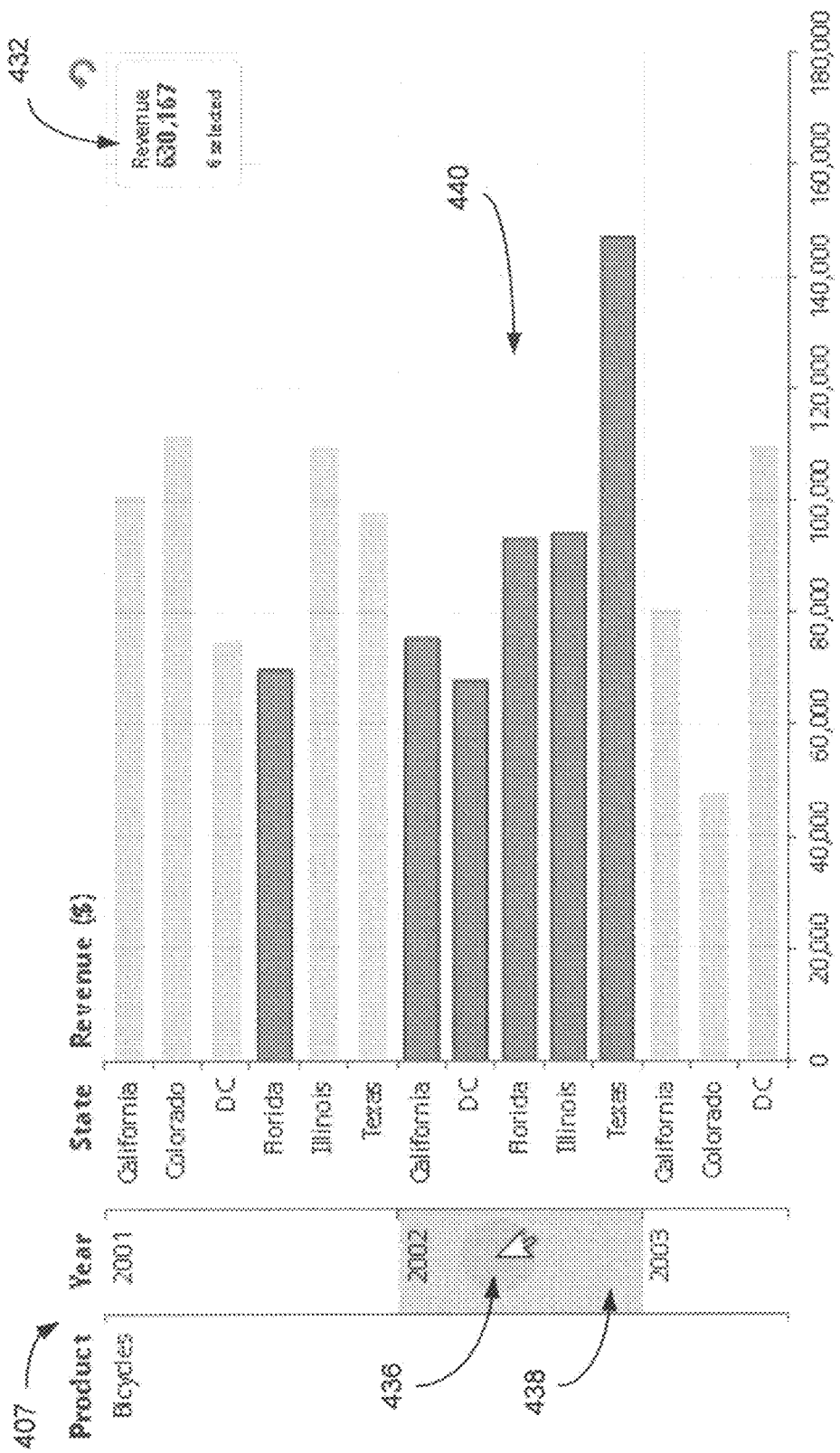
FIG. 4E is a diagram illustrating an example graph using the unified user interface interaction application to select multiple bars using a higher value label.

FIG. 4E is a diagram illustrating an example graph 407 using the unified user interface interaction application 110 to select multiple bars 440 using a higher value label. The data selection module 204 may also receive a selection of a higher ordered member value label in the interactive graph using the unified user interface via location 436 in the year 2002 on the example graph 407. For example, the example graph 407 may include several state labels (e.g, California, DC, Florida, Illinois, Texas) under a higher ordered member value label (e.g. Year 2002). The visualization application 114 then highlights the bars 440 corresponding to those states in the interactive graph 407 associated with the year 2002. The select data analysis module 206 may then compute a data analysis based on all the states under the higher ordered year label in the interactive graph 407. In order words, the select data analysis module 206 may compute an average, or a summary of the data from the selected states. The visualization application 114 may generate information from the data analysis for display in the interactive graph 407. For example, a dialog box 432 summarizing the data front the states 440 may the displayed in the Interactive graph 407.

Figure 5A:
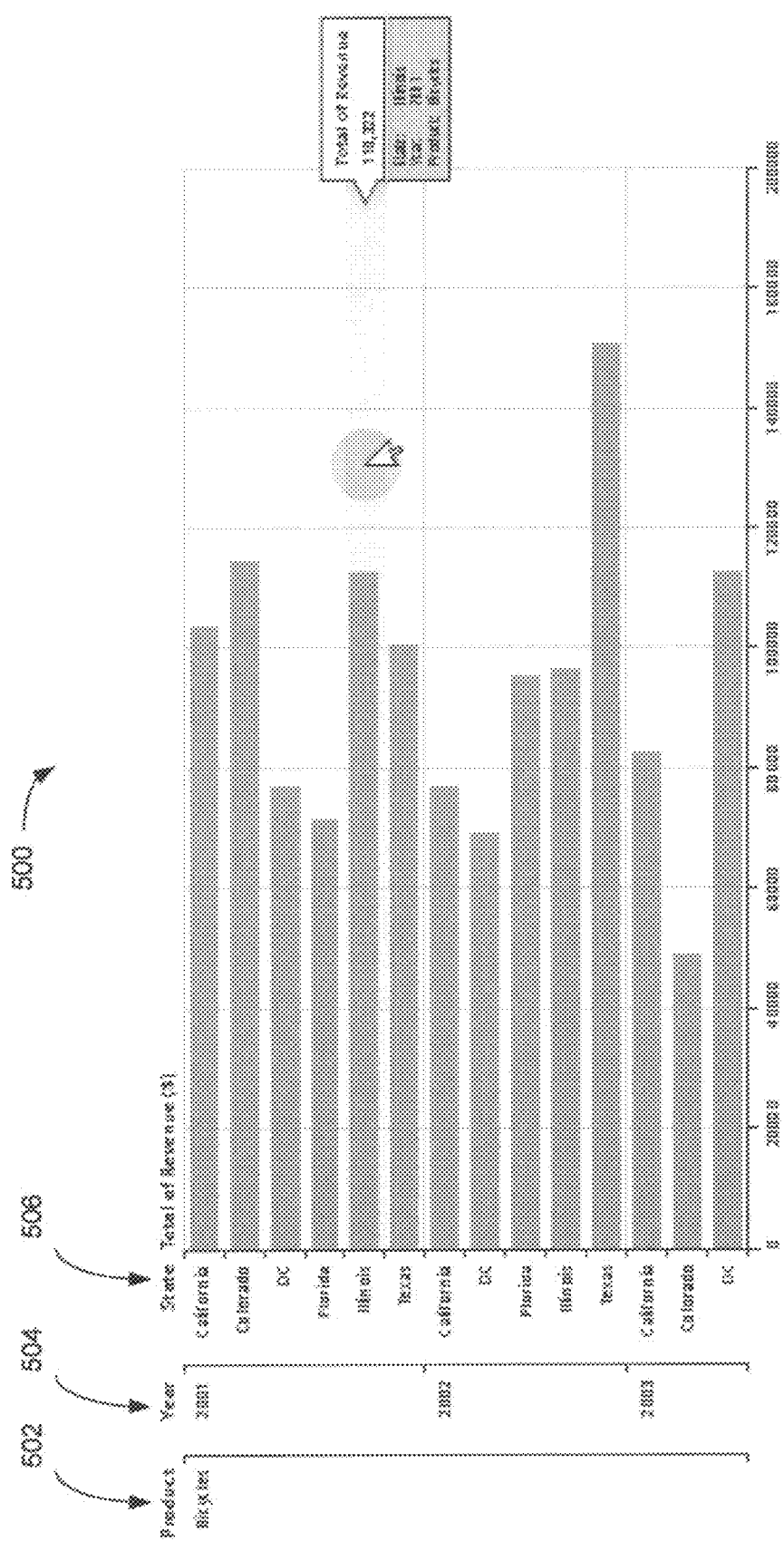
FIG. 5A is a diagram illustrating an example graph with uncollapsed axis labels using the unified user interface interaction application.

FIG. 5A is a diagram illustrating an example graph 500 with un-collapsed axis labels using the unified user interface interaction application 110. The example graph 500 illustrates exploded levels of the vertical axis. For example, the labels may include a product label axis 502, a year label axis 504, and a state label axis 506.

Figure 5B:
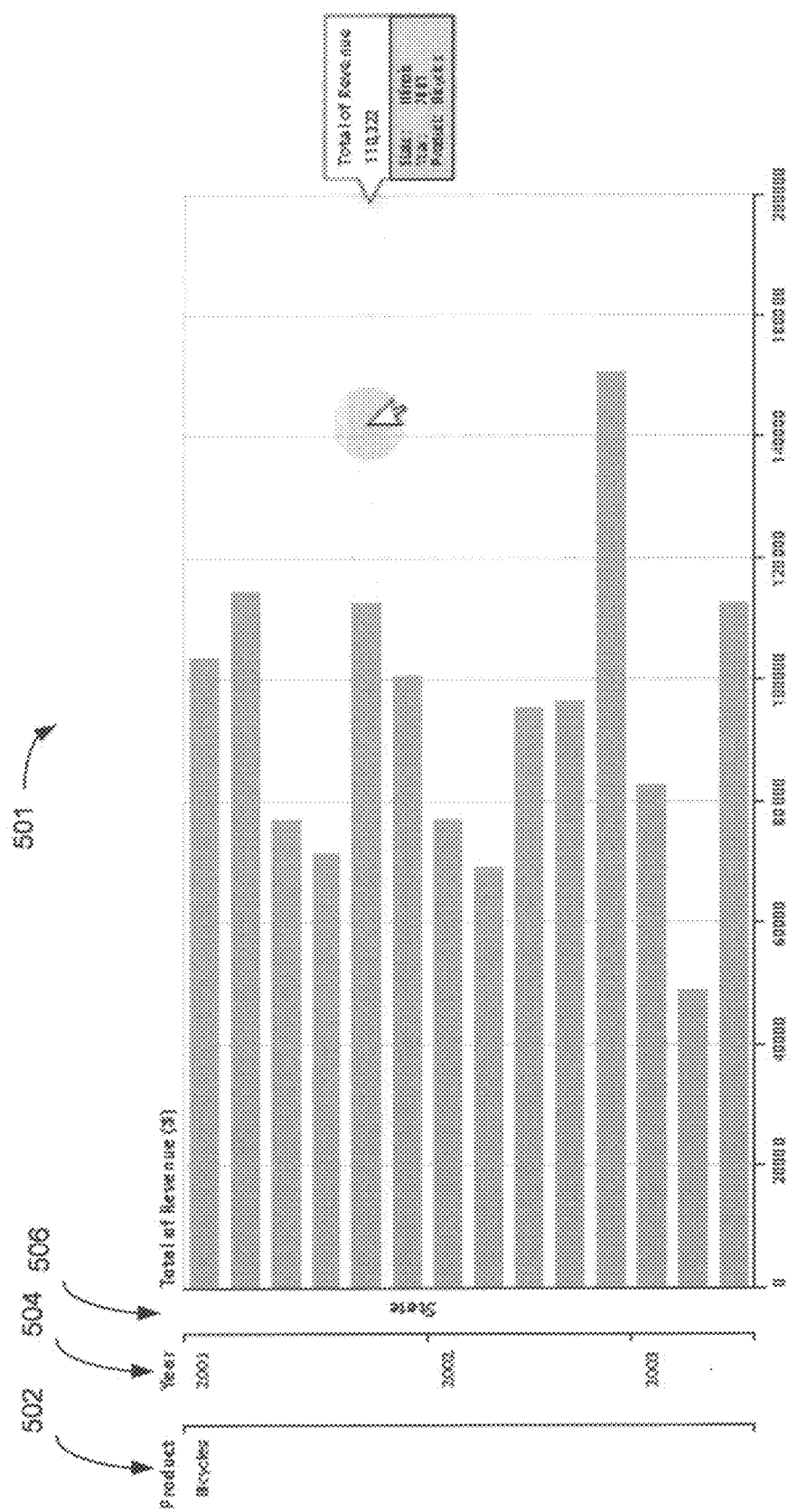
FIG. 5B is a diagram illustrating an example graph with a partially collapsed axis label using the unified user interface interaction application.

FIG. 5B is a diagram illustrating an example graph 501 with a partially collapsed axis label using the unified user interface interaction application 110. The example graph 501 illustrates partially exploded levels of the vertical axis. For example, the labels may include the product label axis 502, the year label axis 504, and the state label axis 506. As illustrated in the example graph 501, the individual states are no longer displayed under the state label axis 506.

Figure 5C:
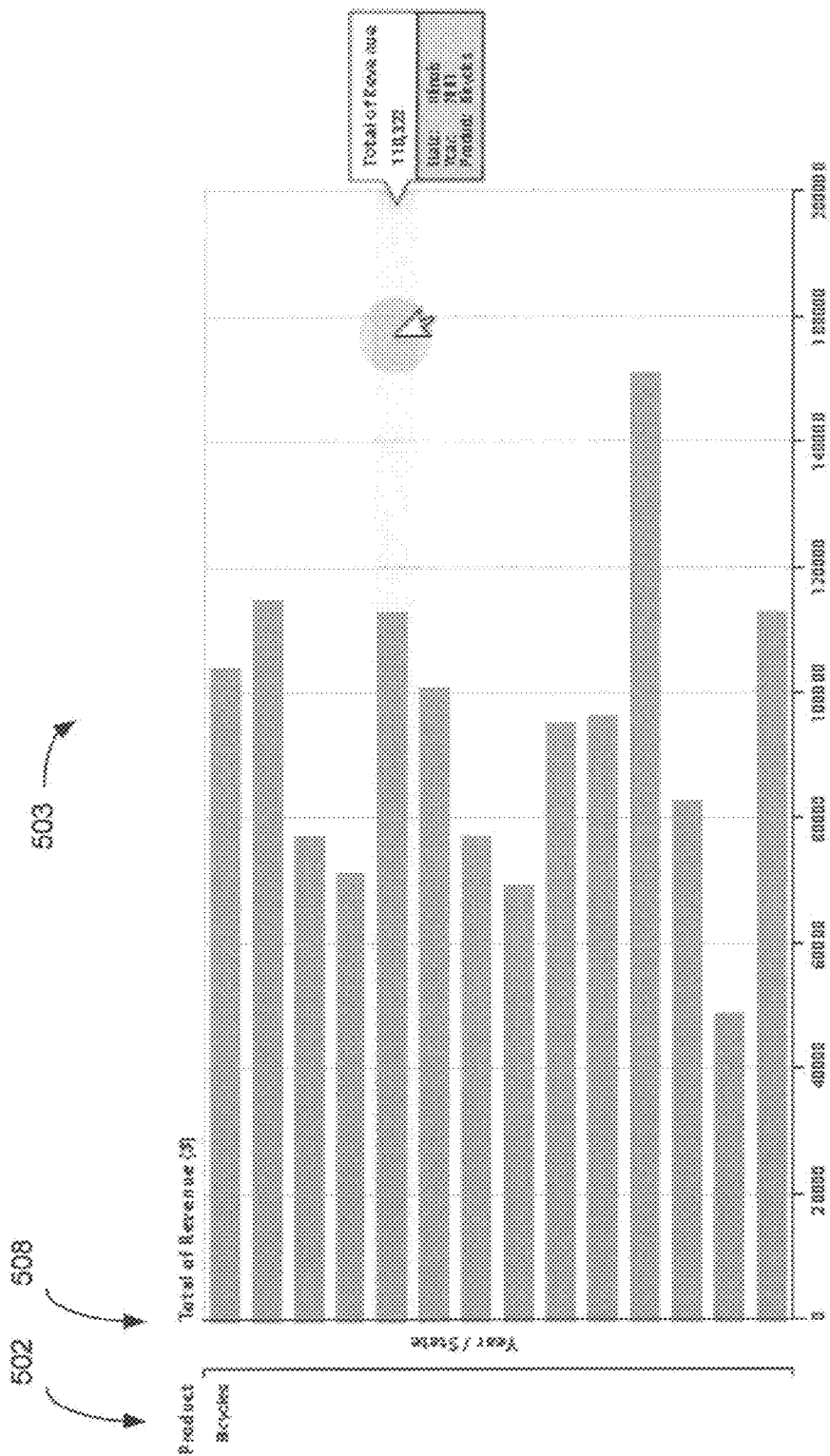
FIG. 5C is a diagram illustrating an example graph with a partially collapsed axis label using the unified user interface interaction application.

FIG. 5C is a diagram illustrating an example graph 503 with a partially collapsed axis label using the unified user interface interaction application 110. The example graph 503 illustrates partially exploded levels of the vertical axis. For example, the labels may include the product label axis 502, and a combined axis 508 for the year and the state. As illustrated in the example graph 501, the individual years and states are no longer displayed under the combined axis 508.

Figure 5D:
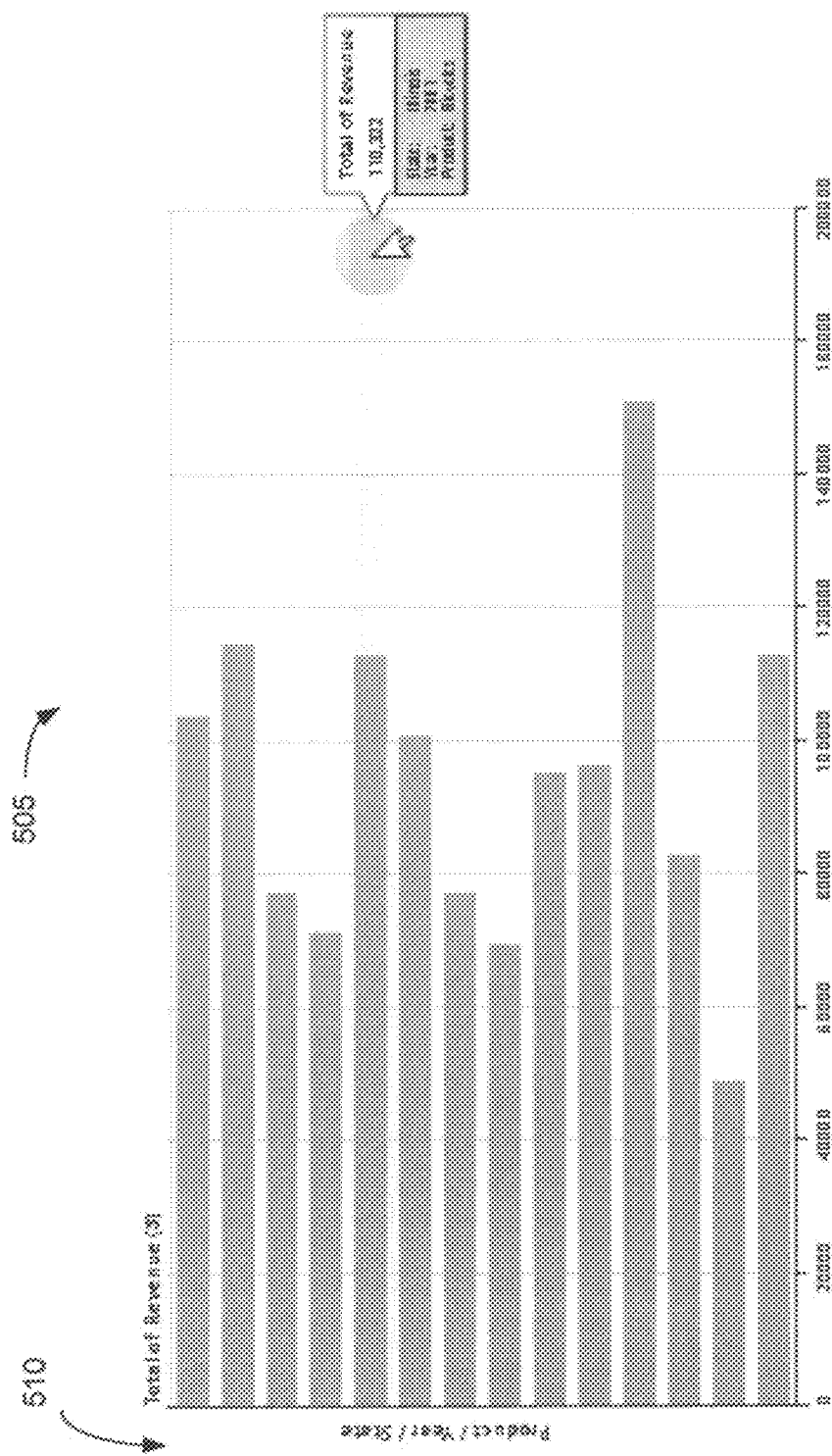
FIG. 5D is a diagram illustrating an example graph with a fully collapsed axis label using the unified user interface interaction application.

FIG. 5D is a diagram illustrating an example graph 505 with a fully collapsed axis label using the unified user interface interaction application 110. The example graph 505 illustrates a fully collapsed vertical axis 510. For example, the labels may now include a combined product, year, and state.

As illustrated in the example graph 505, the individual products, years, and states are no longer displayed under the combined axis 510.

Figure 6A:
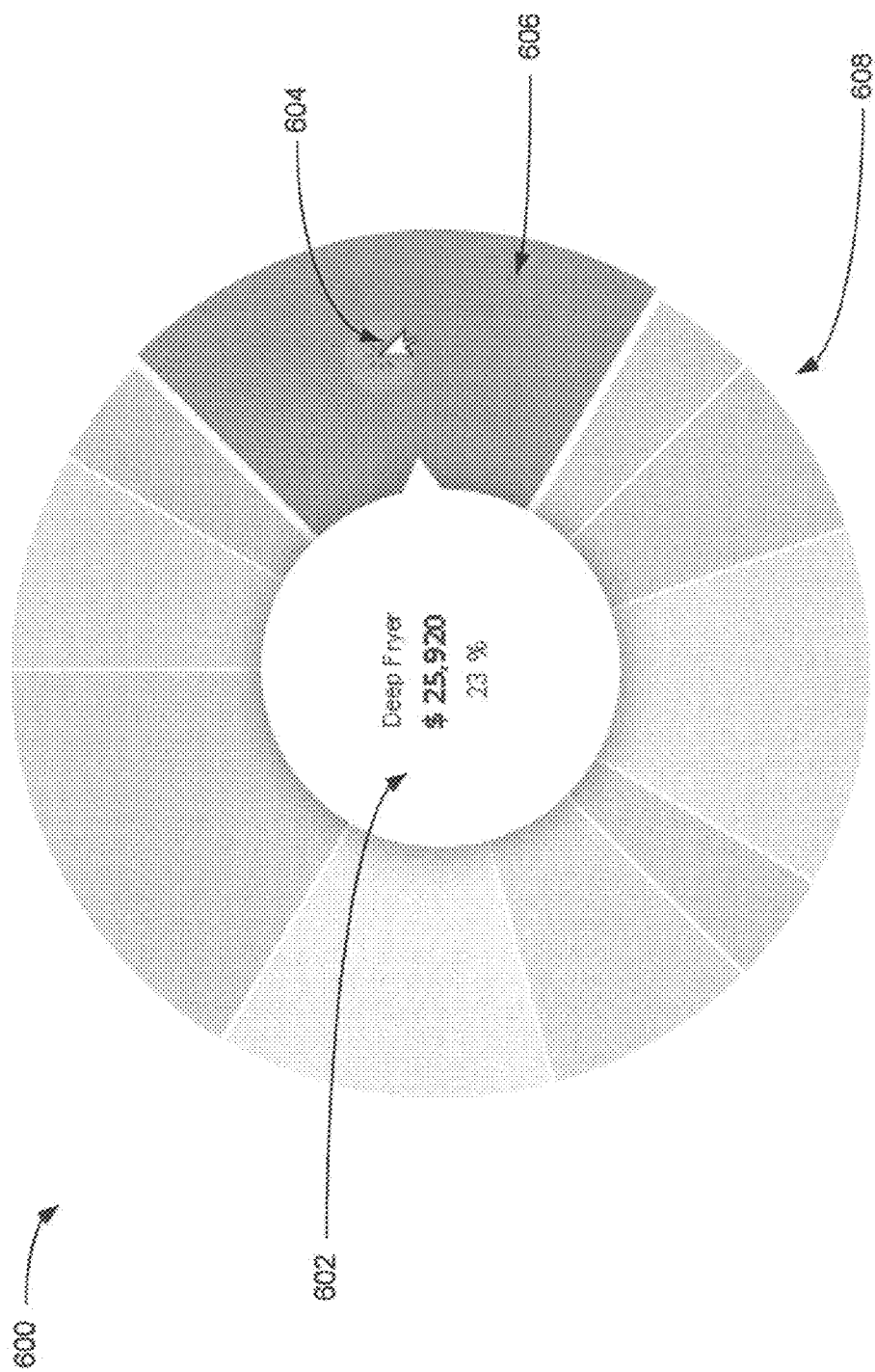
FIG. 6A is a diagram illustrating an example pie graph using the unified user interface interaction application to select a slice.

FIG. 6A is a diagram illustrating an example pie graph 600 using the unified user interface interaction application 110 to select a slice 606. The unified user interface module 202 detects an operation on the example pie graph 600. The operation, for example, may include a tap or a click corresponding to location 604 on a display of the example pie graph 600. The data selection module 204 determines the individual slice 606 corresponding to the location 604. In one embodiment, the individual slice 606 is highlighted in a different color or shade than the remaining non-selected slices 608. In one embodiment, the individual slice 606 may be offset and protrude outside the pie graph 600 to provide a visual guide for the user. The visualization application 114 may dim a display of the remaining non-selected slices 608. The select data analysis module 206 generates and displays a summary dialog area 602 in the center of the pie graph 600. The summary dialog area 602 includes, for example, the revenue value corresponding to the selected slice 606 (e.g., "Deep Fryer"). The summary dialog area 602 may also contain both the actual value and the percentage value of the corresponding data point or individual slice 606. In other words, the summary dialog area 602 provides a quick visual summary for the user having identified the individual slice 606.

Figure 6B:
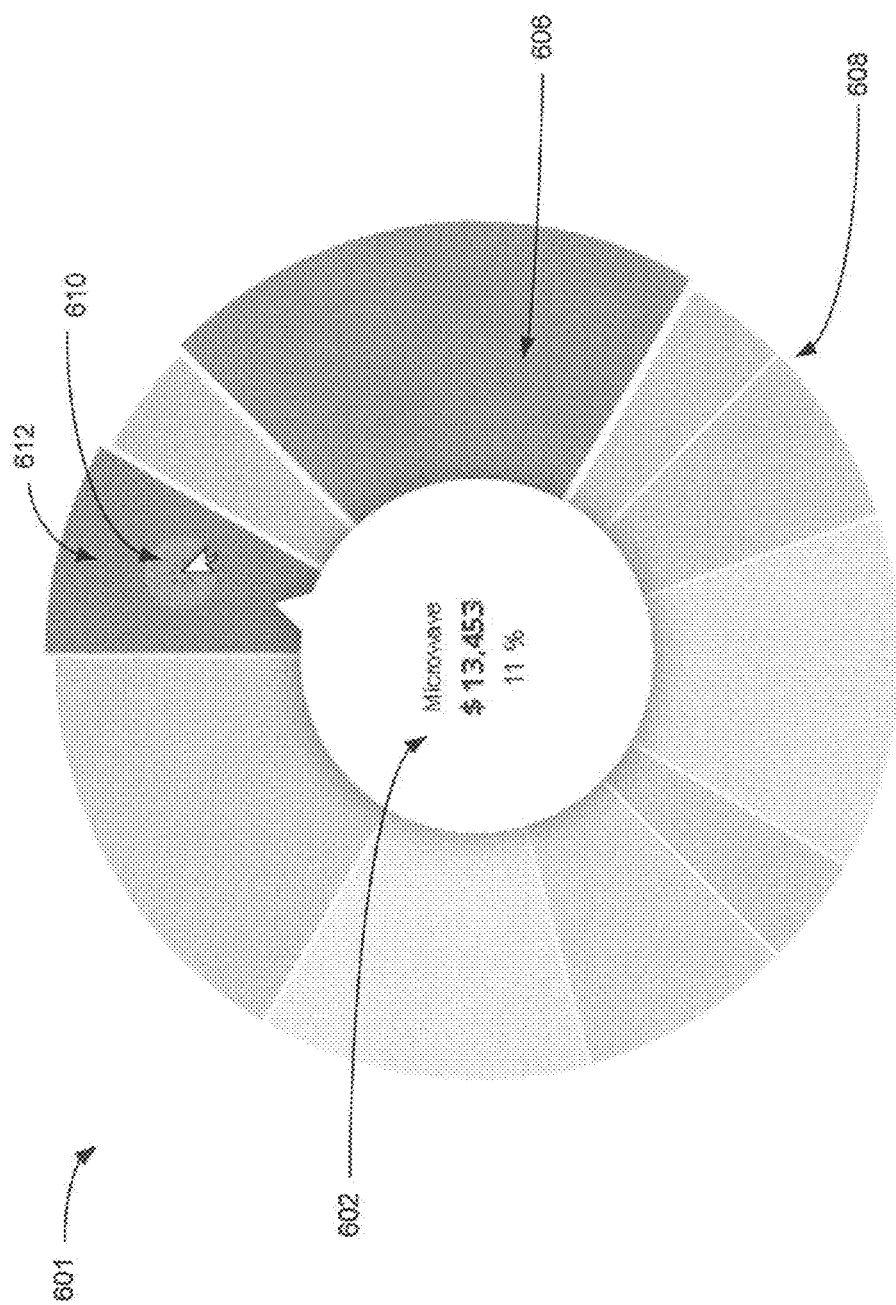
FIG. 6B is a diagram illustrating an example pie graph using the unified user interface interaction application to select another slice.

FIG. 6B is a diagram illustrating an example pie graph 601 using the unified user interface interaction application 110 to select another slice. The unified user interface module 202 detects an operation on the example pie graph 601. In this example, the operation may be a tap or a click corresponding to location 610 on a display of the example pie graph 601 after the user has lapped location 604 in FIG. 6A. The data selection module 204 determines the individual slice 612 corresponding to the location 610. In one embodiment, the individual slice 612 is highlighted in a different color or shade than the remaining non-selected slices 608. The select data analysis module 206 generates and displays the summary dialog area 602 in the center of the pie graph 600. The summary dialog area 602 now includes, for example, the revenue value corresponding to the selected bar 610 (e.g., "Microwave").

Figure 6C:
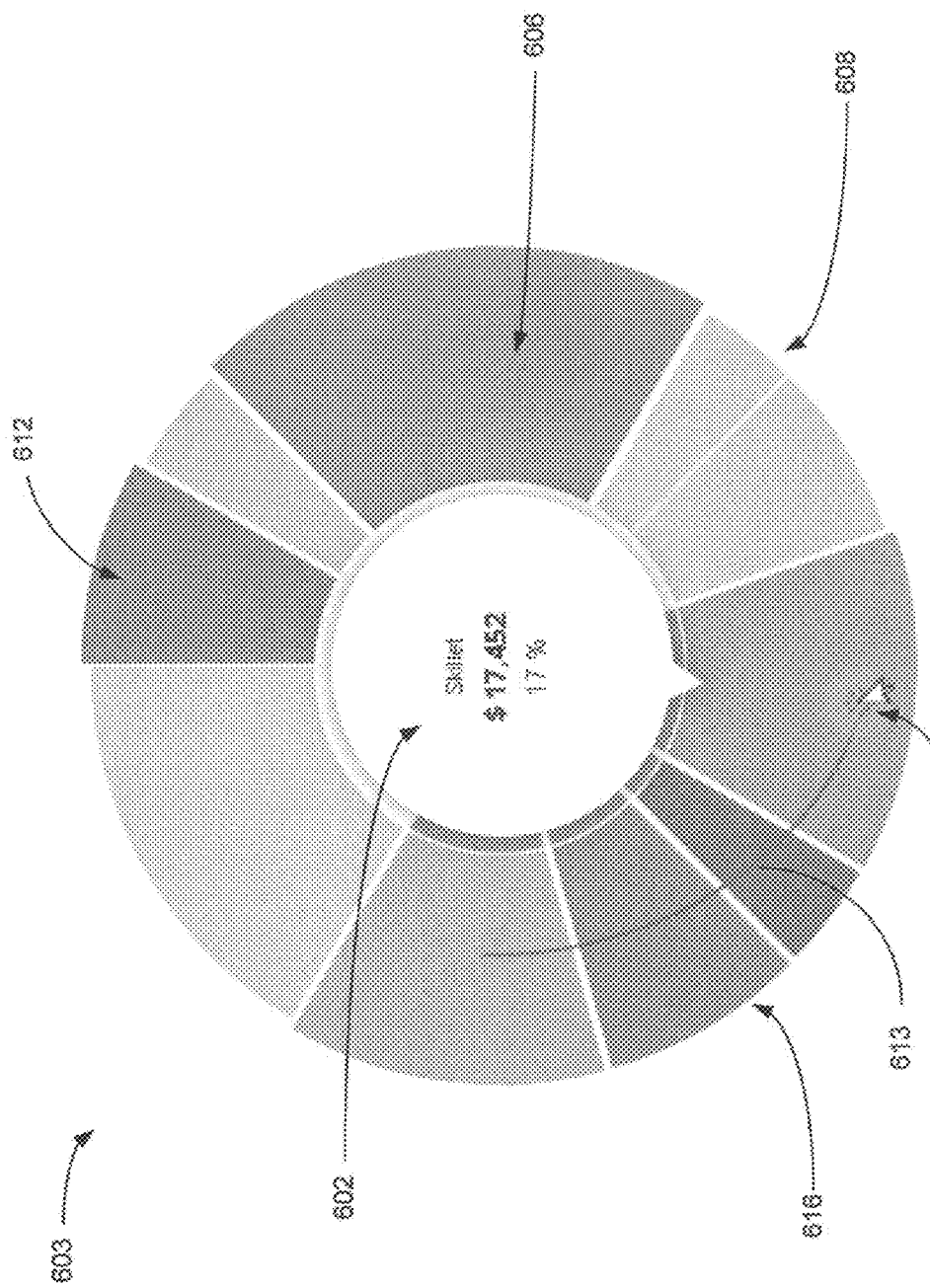
FIG. 6C is a diagram illustrating an example pie graph using the unified user interface interaction application to select multiple slices.

FIG. 6C is a diagram illustrating an example pie graph 603 using the unified user interface interaction application 110 to select multiple slices 616. In this example, the operation may be a swipe 613 ending in location 614. The data selection module 204 determines that the swipe 613 corresponds to multiple slices 616. Similarly, the multiple slices 616 are highlighted in a different color or shade or positioned differently relative to the remaining non-selected slices 608. A summary dialog area 602 corresponding to the selected multiple slices 616 may also be displayed in the center of the example pie graph 603.

Figure 7:
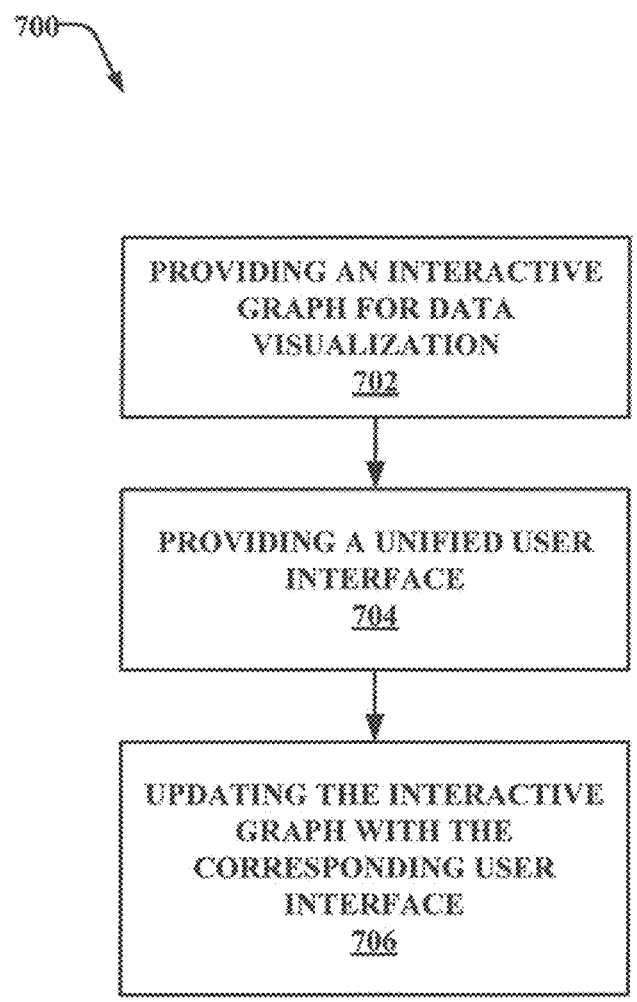
FIG. 7 is a flowchart of a method, in accordance with an example embodiment, for using a unified user interface interaction application.

FIG. 7 is a flowchart of a method 700, in accordance with an example embodiment, for using a unified user interface Interaction application 110. At operation 702, an interactive graph 407 for data visualization is provided. At operation 704, a unifier user interface may be provided to receive an operation on the interactive graph 407. The unified user interface may comprise a pointer user interface and a touchscreen user interface. At operation 706, the interactive graph 407 is updated from the operation on the interactive graph 407 with the corresponding user interface.

Figure 8:
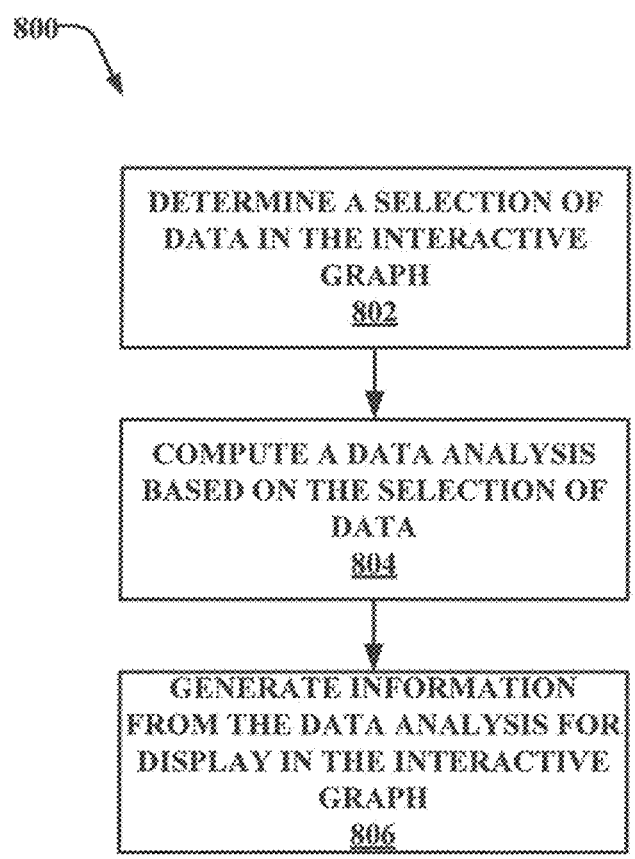
FIG. 8 is a flowchart of a method, in accordance with another example embodiment, for using the unified user interface interaction application to provide information on selected items in a graph.

FIG. 8 is a flowchart of a method 800, in accordance with another example embodiment, for using the unified user interface interaction application 110 to provide information on selected items in a graph. At operation 802, a selection of data in the interactive graph 407 is determined using the unified user interface. At operation 804, a data analysis is computed, based on the selection of data in the interactive graph 407. At operation 806, information is generated from the data analysis for display in the interactive graph 407.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily, configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may the achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 9:
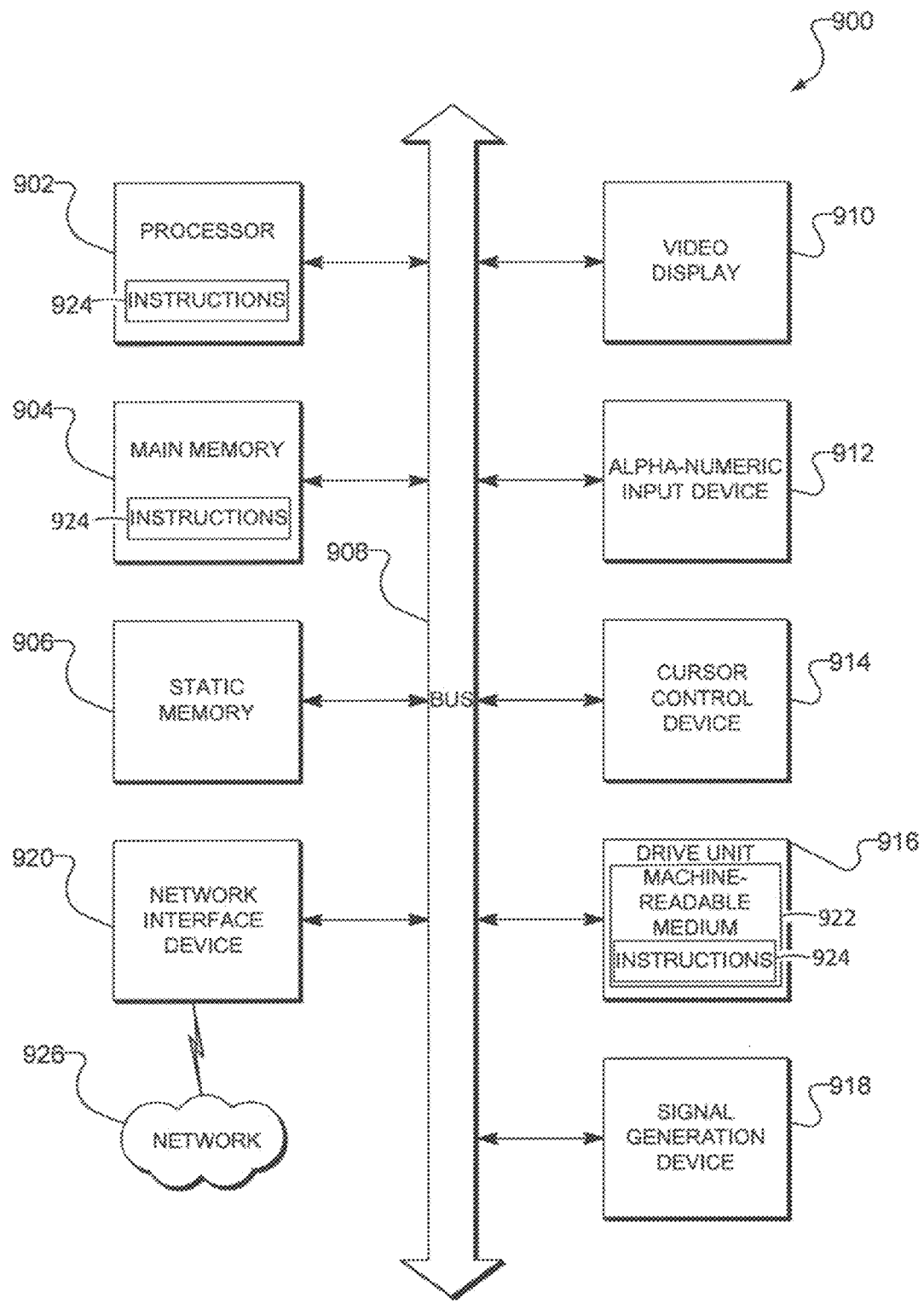
FIG. 9 is a block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine, may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alphanumeric input device 912 (e.g., a keyboard), a user interface (UI) navigation device or cursor control device 914 (e.g., a mouse), a disk drive unit 916, a signal generation device 918 (e.g., a speaker), and a network interface device 920.

The disk drive unit 916 includes a machine-readable storage medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable storage medium 922 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present description, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wifi and WiMax networks). The term "transmission medium" shall the taken to include any intangible medium that is capable of storing, encoding, or earning instructions for execution by the machine, and includes digital or analog communications signals or other intangible medium to facilitate communication of such software.

It should be noted that various modifications and changes may be made to these example embodiments without departing from the broader spirit and scope of the present invention.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A computer-implemented method comprising:
providing an interactive graph for data visualization;
providing a unified user interface to receive an operation on the interactive graph, the unified user interface comprising a pointer user interface and a touchscreen user interface;
receiving a selection of a first component of the interactive graph using the unified user interface;
receiving a selection of a second component of the interactive graph using the unified user interface without using a modifier key from the pointer user interface;

causing a display of an outline of the first and second component in response to receiving the selection of the second component;

detecting a user selection outside the interactive graph after outlining the first and second component;

causing a display of information of the first and second component of the interactive graph in response to detecting the user selection outside the interactive graph; and updating the interactive chart from the operation on the interactive graph with the corresponding user interface.

2. The computer-implemented method of claim 1, further comprising:

determining a selection of data in the interactive graph using the unified user interface;

computing a data analysis based on the selection of data in the interactive graph; and generating information from the data analysis for display in the interactive graph.

3. The computer-implemented method of claim 1, further comprising:

detecting a swipe gesture corresponding to a plurality of components of the interactive graph using the touchscreen user interface;

highlighting the selection of the plurality of components of the interactive graph;

computing a data analysis based on the selection of the plurality of components in the interactive graph; and generating information from the data analysis for display in the interactive graph.

4. The computer-implemented method of claim 1, further comprising:

receiving a selection of a higher ordered member value label in the interactive graph using the unified user interface;

highlighting a plurality of components in the interactive graph corresponding to the selected higher ordered member value label;

computing a data analysis based on the plurality of components in the interactive graph; and generating information from the data analysis for display in the interactive graph.

5. The computer-implemented method of claim 1, further comprising:

determining a selection of a label corresponding to an axis of the interactive graph using the unified user interface, the axis associated with a plurality of labels; and collapsing a display of the plurality of labels in response to the selection of the label to generate a combined label corresponding to the axis of the interactive graph.

6. The computer-implemented method of claim 1, wherein the interactive graph comprises a bar chart, a stacked bar chart, a pie chart, or a line chart.

7. The computer-implemented method of claim 1, wherein the pointer user interface is configured to track a pointer controlled by a cursor control device and a touchscreen user interface is configured to detect a tap or a touch on the display.

8. A system comprising:

a processor comprising a unified user interface interaction module and a visualization module, the visualization module configured to generate an interactive graph for data visualization; and the unified user interface interaction module comprising a unified user interface module configured to receive an operation on the interactive graph, the unified user interface module comprising a pointer user interface module and a touchscreen user interface module, the visualization module configured to receive a selection of a first component of the interactive graph using the unified user interface, to receive a selection of a second component of the interactive graph using the unified user interface without using a modifier key from the pointer user interface, to cause a display of an outline of the first and second component in response to receiving the selection of the second component, to detect a user selection outside the interactive graph after outlining the first and second component, and to cause a display of information of the first and second component of the interactive graph in response to detecting the user selection outside the interactive graph, and to update the interactive chart from the operation on the interactive graph with the corresponding user interface module.

9. The system of claim 8, wherein the unified user interface interaction module comprises a data selection module configured to determine a selection of data in the interactive graph using the unified user interface, and a select data analysis module configured to compute a data analysis based on the selection of data in the interactive graph and to generate information from the data analysis for display in the interactive graph.

10. The system of claim 8, wherein the unified user interface interaction module comprises a data selection module configured to detect a swipe gesture corresponding to a plurality of components of the interactive graph using the touchscreen user interface, the data visualization module configured to highlight the selection of the plurality of components of the interactive graph, the selected data analysis module configured to compute a data analysis based on the selection of the plurality of components in the interactive graph, the data visualization module configured to generate information from the data analysis for display in the interactive graph.

11. The system of claim 8, wherein the unified user interface interaction module comprises a data selection module configured to receive a selection of a higher ordered member value label in the interactive graph using the unified user interface, the data visualization module configured to highlight a plurality of components in the interactive graph corresponding to the selected higher ordered member value label, the select data analysis module configured to compute a data analysis based on the plurality of components in the interactive graph, the visualization module configured to generate information from the data analysis for display in the interactive graph.

12. The system of claim 8, wherein the unified user interface interaction module comprises a data selection module configured to determine a selection of a label corresponding to an axis of the interactive graph using the unified user interface, the axis associated with a plurality of labels, and the visualization module configured to collapse a display of the plurality of labels in response to the selection of the label to generate a combined label corresponding to the axis of the interactive graph.

13. The system of claim 8, wherein the interactive graph comprises a bar chart, a stacked bar chart, a pie chart, or a line chart.

14. The system of claim 8, wherein the pointer user interface is configured to track a pointer controlled by a cursor control device and a touchscreen user interface is configured to detect a tap or a touch on the display.

15. A non-transitory machine-readable storage medium storing instructions which, when executed by at least one processor, performs operations comprising:

providing an interactive graph for data visualization;

providing a unified user interface to receive an operation on the interactive graph, the unified user interface comprising a pointer user interface and a touchscreen user interface;

receiving a selection of a first component of the interactive graph using the unified user interface;

receiving a selection of a second component of the interactive graph using the unified user interface without using a modifier key from the pointer user interface;

causing a display of an outline of the first and second component in response to receiving the selection of the second component;

detecting a user selection outside the interactive graph after outlining the first and second component;

causing a display of information of the first and second component of the interactive graph in response to detecting the user selection outside the interactive graph; and updating the interactive chart from the operation on the interactive graph with the corresponding user interface.

16. The non-transitory machine-readable storage medium of claim 15, further comprising:

determining a selection of data in the interactive graph using the unified user interface;

computing a data analysis based on the selection of data in the interactive graph; and generating information from the data analysis for display in the interactive graph.

\* \* \* \* \*